(12) United States Patent
Verkuijlen et al.

(10) Patent No.: US 11,198,286 B2
(45) Date of Patent: Dec. 14, 2021

(54) MANDREL FOR PRINTING APPARATUS, A PRINTING CYLINDER, A PRINTING APPARATUS

(71) Applicant: MPS Holding B.V., Arnhem (NL)

(72) Inventors: Adrianus Henricus Ignatius Maria Verkuijlen, Didam (NL); Koen Posthouwer, Utrecht (NL)

(73) Assignee: MPS HOLDING B.V., Arnhem (NL)

( * ) Notice: Subject to any disclaimer, the term of this patent is extended or adjusted under 35 U.S.C. 154(b) by 0 days.

(21) Appl. No.: 17/025,142

(22) Filed: Sep. 18, 2020

(65) Prior Publication Data
US 2021/0086496 A1     Mar. 25, 2021

(30) Foreign Application Priority Data

Sep. 20, 2019   (NL) ..................................... 2023862

(51) Int. Cl.
*B41F 3/54*         (2006.01)
(52) U.S. Cl.
CPC ..................................... *B41F 3/54* (2013.01)
(58) Field of Classification Search
CPC ........................................................ B41F 3/54
USPC ....................................................... 101/479
See application file for complete search history.

(56) References Cited

U.S. PATENT DOCUMENTS

| 3,739,722 | A  | * | 6/1973  | Zottoli ..................... | B41F 13/08 101/375 |
| 4,150,622 | A  | * | 4/1979  | Stollenwerk ............ | B41F 13/10 101/378 |
| 6,615,722 | B2 | * | 9/2003  | Alberstadt .............. | B41F 13/08 101/217 |
| 6,647,879 | B1 | * | 11/2003 | Papadopoulos ......... | B41F 13/10 101/329 |

(Continued)

FOREIGN PATENT DOCUMENTS

| DE | 41 06 677 C1  | 4/1992 |
| EP | 0 366 395 A2  | 5/1990 |

(Continued)

OTHER PUBLICATIONS

Dutch Search Report, issued in Priority Application No. 2023862, dated Jul. 22, 2020.

*Primary Examiner* — Anthony H Nguyen
(74) *Attorney, Agent, or Firm* — Birch, Stewart, Kolasch & Birch, LLP

(57) ABSTRACT

A mandrel for use in a printing apparatus includes a substantially cylindrical mandrel shaft and a locking assembly including a stop ring, a locking ring, and a plurality of deformable rings which are slidably and coaxially mounted on the mandrel shaft. Each deformable ring has a cross-sectional profile in a cross-sectional plane in which the mandrel shaft axis extends, which profile includes a first arm and a second arm which are integrally connected to each other at a first connection point. The first arm and the second arms include an angle which is sharper in the unlocked (Continued)

position than in the locked position of the locking assembly. The first arm has a first-arm-end remote from the first connection point, which defines the outer diameter of the deformable ring. The second arm has a second-arm-end remote from the first connection point, which second-arm-end defines the inner diameter of the deformable ring.

21 Claims, 5 Drawing Sheets

(56) References Cited

U.S. PATENT DOCUMENTS

| | | | | |
|---|---|---|---|---|
| 6,837,345 | B1 * | 1/2005 | Lauble | F16F 1/371 188/378 |
| 8,915,185 | B2 * | 12/2014 | Pantchev | B41F 27/12 101/389.1 |
| 9,579,876 | B1 | 2/2017 | Maeda et al. | |
| 2007/0251847 | A1 * | 11/2007 | Smoot | B41N 7/00 206/446 |
| 2009/0031910 | A1 | 2/2009 | Simon | |
| 2014/0311368 | A1 | 10/2014 | Rossini | |
| 2017/0274640 | A1 * | 9/2017 | Wientjes | B41F 7/04 |

FOREIGN PATENT DOCUMENTS

| | | |
|---|---|---|
| WO | WO 2006/114534 A2 | 11/2006 |
| WO | WO 2008/108631 A1 | 9/2008 |
| WO | WO 2016/159764 A2 | 10/2016 |

\* cited by examiner

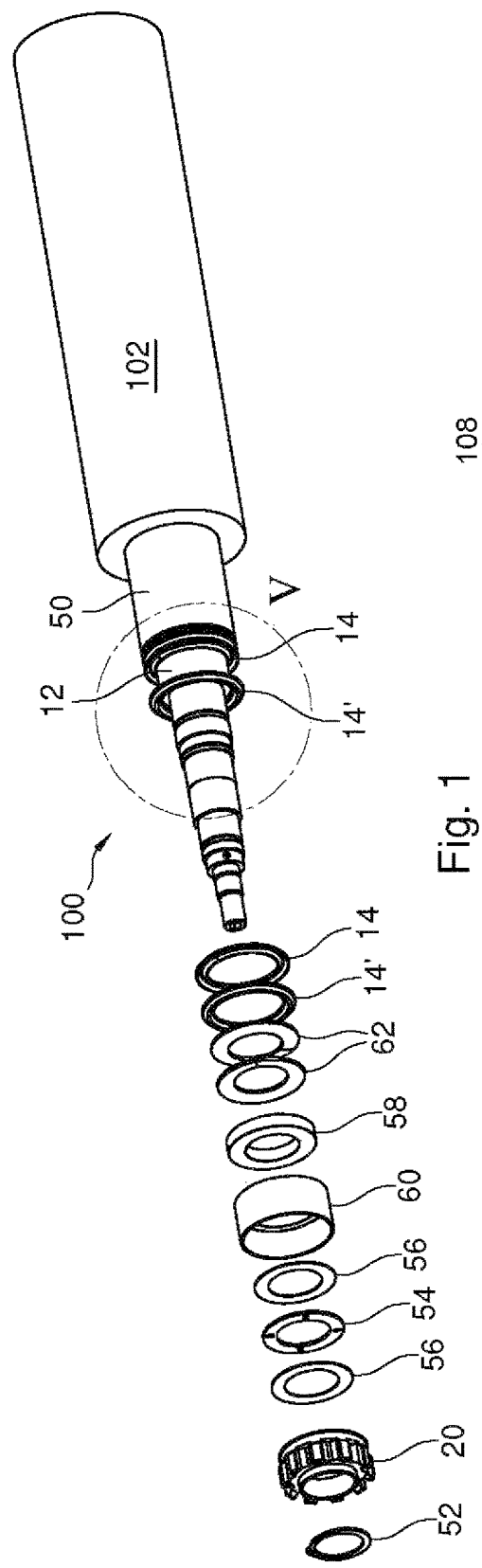
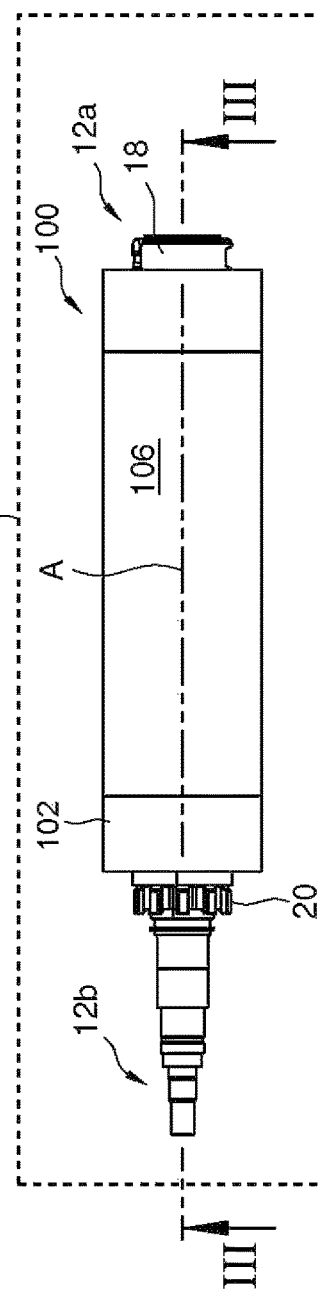
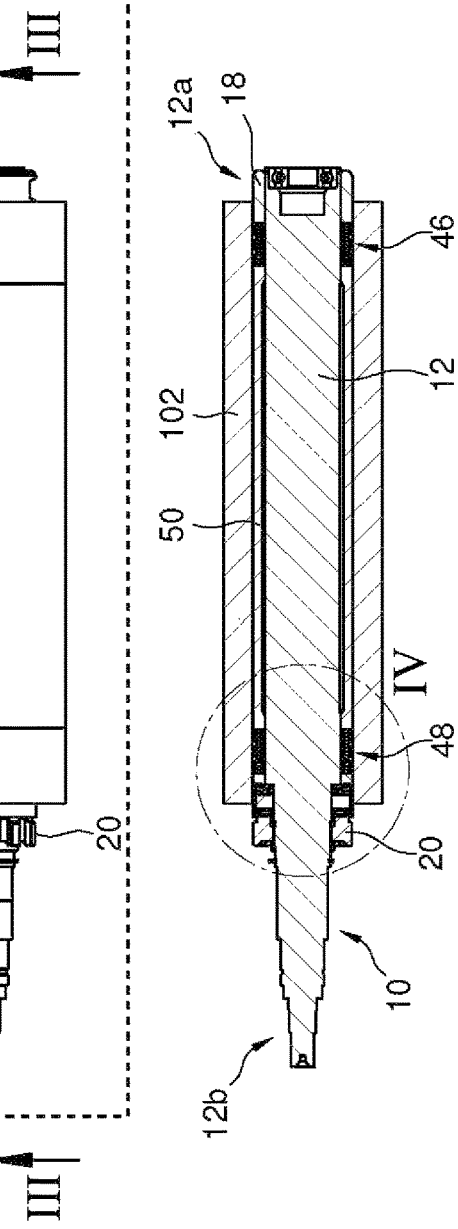
Fig. 1
Fig. 2
Fig. 3

MANDREL FOR PRINTING APPARATUS, A PRINTING CYLINDER, A PRINTING APPARATUS

FIELD

The invention relates to a mandrel, as well as a sleeve type printing apparatus cylinder with such a mandrel for use in a printing apparatus. The invention also relates to a printing machine comprising such a sleeve type printing apparatus cylinder.

BACKGROUND

The use of printing apparatus cylinders comprising a mandrel and a printing sleeve are known from the art, for example, for flexographic or (lithographic) off-set printing. Generally, the mandrel is an air mandrel that comprises a rigid cylindrical body, such as a steel shaft, on which a printing sleeve is removably mounted. The cylindrical surface of the air mandrel contains outflow openings via which air can be supplied when a sleeve has to be mounted on the mandrel or removed from the mandrel. A variety of printing sleeves with different radii can be mounted to provide the printing cylinder diameter required for a printing job. The image to be printed is provided directly on the printing sleeve or may be provided on a (flexible) printing plate or mold that is mounted on the printing sleeve using techniques known from the art. In this text, "printing cylinder" and "printing apparatus cylinder" are used interchangeably. The words "printing apparatus cylinder" refer to any cylinder in a printing machine which is involved in the printing process, such as a printing cylinder transferring the image to be printed to the substrate web, an impression cylinder, or e.g. a blanket cylinder for offset printing. The words "printing cylinder" normally specifically refer to the printing cylinder which is in contact with the substrate web and transfers the image to the web. Also the words "printing sleeve" and "sleeve" are used interchangeably. The sleeve does not always be the sleeve which is mounted on a printing cylinder transferring the image to the substrate web, which sleeve is generally referred to as "printing sleeve". It can also be a sleeve which is mounted on, for example, an impression cylinder or a blanket cylinder.

Mounting the printing sleeve on the mandrel is often performed using compressed air. The printing sleeve is a substantially cylindrical body having a through hole with an inner diameter that is slightly smaller than the outer diameter of the mandrel. This allows the printing sleeve to fit with a press fit or interference fit on the mandrel. The printing sleeve further comprises at least one radially deformable or radially compressible layer that enables an inner surface of the printing sleeve to expand radially outwardly under pressure, for example by using compressed air. The printing sleeve is positioned in line with the mandrel, after which compressed air is supplied via the outflow openings provided in the cylindrical outer surface of the mandrel. The compressed air causes a radially outward expansion of the inner surface of the printing sleeve, therewith increasing its inner diameter. The increase in inner diameter is sufficient to slide the printing sleeve over the mandrel. Upon ending the supply of compressed air, the printing sleeve inner surface shrinks to provide the interference fit or press fit between the inner cylindrical surface of the sleeve and the outer cylindrical surface of the mandrel.

The precision of the known printing sleeves should be improved to obtain a more consistent and accurate printing result. The precision of a printing cylinder or printing sleeve can be indicated by a parameter called the total indicated run out value or TIR-value. The higher the TIR-value, the lower the precision. In fact, the TIR-value is an indication of the margin within which the outer cylinder surface may extend around the theoretically desired diameter of the outer surface. In other words, the TIR-value is an indication of the tolerance which is defined by the difference between the minimum and maximum diameter around a theoretically desired diameter. The smaller this margin, the smaller the TIR-value and the better the precision of the printing cylinder or printing sleeve. Part of the problems of the imperfect precision of the known printing sleeves is caused by the radially compressible layer that is present in the printing sleeve and that is needed to be able to mount the known sleeve on the air mandrel. As a result, the outer surface of printing sleeve may displace with respect to the central axis of the air mandrel. This causes a deviation which is reflected by an increase of the TIR-value of the printing cylinder. As explained above, higher TIR-value corresponds with a larger deformation and, as a result, with a lower print quality. Another disadvantage of the sleeves having an compressible inner layer is that such sleeves have a limited life time in view of the deterioration of the compressible inner layer.

US 2014/0311368 discloses an air-mountable printing sleeve for mounting on a mandrel, wherein the printing sleeve is a multi-layered cylindrical sleeve provided with at least two rigid radial spacer members that substantially replace the deformable layers. The printing sleeve comprises an inner layer and an outer layer that are connected by two rigid, circular spacer members disposed at the opposite extreme ends of the printing sleeve. The inner layer comprises a deformable material that is radially expandable or radially deformable. The inner surface of the inner layer has an inner diameter that is slightly smaller than the outer diameter of a mandrel, which inner diameter can be increased using for example compressed air. This allows the printing sleeve to be mounted on the mandrel with an interference fit. The outer layer of the printing sleeve is made of a material that is rigid and non-expandable by compressed air. The outer layer is fixedly connected with at least two rigid spacer members comprising annular rings that extend radially and circumferentially in an empty space between the inner layer and the outer layer. The outer annular surface of each extreme end of the inner layer is fixedly connected to the inner annular surface of a corresponding end spacer member. The end spacer members connect the inner layer and the outer layer. Any spacer members not disposed on the extreme outer ends of the printing sleeve are separated from the inner layer with a gap between the inner surface of the spacer members and the outer surface of the inner layer. The gap is very small, for example in the order of fractions of a millimeter. The gap allows the expansion and shrinkage of the inner layer required for mounting the printing sleeve to the mandrel.

A disadvantage of the printing sleeve according to US 2014/0311368 is that the gap between the spacer members and the inner layer of the printing sleeve allow vibration and deformation of the printing sleeve, thus reducing the TIR-value and the print quality. Furthermore, the inner layer and the outer layer of the printing sleeve are only connected to each other on the opposite extreme ends of the printing sleeve, which is a disadvantage, especially in printing sleeves with a greater length.

This problem has been recognized in WO2006114534 of which the US-equivalent is US2009031910 and which represents the closest prior art. This publication discloses a printing shaft assembly on which a metal printing sleeve can be mounted. The connection between the metal printing sleeve and the shaft assembly is effected by metal washers of which the radially outer ends are inclined relative to a plane that extends perpendicular to the axis of the shaft assembly. By virtue of a clamping force exerted in the axial direction on the metal washers, the radial outer ends are deformed so that the washers become more flat and obtain an increased outer diameter. The outer circumferential edge of the radially outer ends thus engages the inner surface of the printing sleeve and performs a clamping action. The publication discloses two sets of washers disposed at the two axial extremities of the shaft assembly and the sleeve cooperating therewith. The contact surface between the washers and the sleeve is very small and compressing the washers requires a complicated control assembly including a control shaft that is axially movably arranged in a support shaft of the shaft assembly, transmission rings and cotter pins that pass through the transmission rings, the support shaft and the control shaft. The transmission rings and cotter pins are provided adjacent both axial extremities of the support shaft and the control shaft extends over the entire length of the support shaft through the support shaft. This complicated control assembly is necessary for compressing the two sets of washers to the substantially same extend when clamping between the support shaft and the printing sleeve is needed. Consequently, the shaft assembly known from WO2006114534 and US2009031910 is beneficial in that it provides the possibility to use an exchangeable metal printing sleeve. However, the clamping force that may be obtained with the axially compressible washers is limited and the construction for the compression of the washers is complicated.

WO2016159764, which forms the closest prior art and has the features of the pre-characterizing portion of claim 1, aimed at providing a solution for the disadvantages conventional mandrels with deformable printing sleeves and the disadvantages of WO2006114534. In WO2016159764, the deformable rings are manufactured from compressible plastic, e.g. polyurethane, and have a rectangular cross sectional profile in the released state when viewed perpendicular to a cross-sectional plane in which the axis of the mandrel shaft extends. In the locked state, the rings are axially compressed and as a consequence of material displacement within the ring radially expanded. The known mandrel has a number advantages. In particular the mandrel of WO2016159764 substantially removes the disadvantages of deformable printing sleeves by providing a locking assembly for connecting the mandrel and the printing sleeve. As a result, a rigid, non-deformable printing sleeve can be mounted on the mandrel. The deformation of the printing cylinder is therewith substantially prevented and an improved total indicated run out (TIR) can be achieved. This in turn provides a better print quality even at high throughput speeds. The plastic expansion rings each have a width in the range of 4-20 mm. Consequently, the circumferential surface of the expansion rings that abuts against the inner surface of a sleeve is relatively large. By virtue of this large contact surface a very strong press fit connection is obtained when the expansion rings are in the expanded state. This is contrast to the metal washers which only have a very small contact surface that engages the inner surface of the sleeve. The known mandrel obviates the use of compressed air to mount the printing sleeve, as the printing sleeve can be mounted and subsequently locked by bringing the expansion rings in an axially compressed and radially expanded state using the locking ring. The solid and rigid printing cylinder sleeve that may be used may have a much longer life time than the deformable sleeves used with the conventional air mandrels. The polyurethane expansion rings could be easily replaced when necessary, for example, when the life time of the expansion ring has been reached or when a printing cylinder sleeve with a different internal diameter has to be mounted on the mandrel. Normally, the printing cylinder sleeves for a respective printing apparatus all have the same internal diameter but may have different outer diameters in order to be able to create images of different printing lengths. However, it may be possible that the same type of mandrel can be fitted in printing apparatuses of different types and that for the one type printing apparatus the printing cylinder sleeves have a different internal diameter than for another type printing apparatus. This difference can be accommodated by replacing the expansion rings and the spacer rings having a first diameter with expansion rings and spacer rings having a second diameter. The cylindrical mandrel shaft of the mandrel may thus be usable in variable types of printing apparatuses.

SUMMARY

Although initial tests of the mandrel of WO2016159764 proved to be very promising, more elaborate test have shown that, when the temperature of the mandrel changes, the polyurethane rings radially expand, and more importantly shrink at a different pace than the metal printing cylinder sleeve causing the metal printing cylinder sleeve to remain clamped on the mandrel shaft even if the locking ring is in a release position. Consequently, in some instances the printing sleeve cannot be removed even if a user desires to do so.

The present invention aims to provide a solution for this problem while keeping the advantages the mandrel known from WO2016159764 as discussed above in the background section.

To that end, the invention provides the mandrel according to claim 1. In particular, the invention provides a mandrel for use in a printing apparatus, the mandrel comprising:
  a substantially cylindrical mandrel shaft extending along a mandrel shaft axis; and
    a locking assembly, comprising:
    a stop ring;
    a locking ring; and
    a plurality of deformable rings which are slidably and coaxially mounted on the mandrel shaft,
wherein the deformable rings are mounted between the stop ring and the locking ring, and wherein the locking assembly has a locked position in which the locking ring is positioned closer to the stop ring than in an unlocked position, wherein in the locked position an outer diameter of the deformable rings is larger than in the unlocked position of the locking assembly, wherein each deformable ring has a cross-sectional profile in a cross-sectional plane in which the mandrel shaft axis extends, characterized in that the cross-sectional profile comprises a first arm and a second arm which are integrally connected to each other at a first connection point, wherein the first connection point is at a first diameter which is between an inner diameter and an outer diameter of the deformable ring, and wherein, viewed perpendicular to the cross-sectional plane, the first arm and the second arms respectively extend in a first direction and a second direction which first and second directions include an angle which is sharper in the unlocked position than in the locked position of the locking assembly, wherein the first arm has an first-arm-end remote from the first connection point which first-arm-end defines the outer diameter of the deformable ring, wherein the second arm has a second-arm-end remote from the first connection point which second-arm-end defines the inner diameter of the deformable ring.

With the solution according to the invention, the choice of material for the deformable rings can be more focused on the thermal expansion characteristic of the material than on the compressibility properties of the material. The material for deformable rings of WO2016159764, in particular polyurethane, was chosen mainly with compressibility characteristics in mind. Thermal expansion did not play an important role when selecting the material for the deformable rings.

In contrast, with the present invention, the material choice has been mainly guided by the thermal expansion coefficient of the material, which should either be small relative to the thermal expansion coefficient of steel or aluminium (of the printing cylinder sleeve) or be of the same order and have approximately the same speed of shrinkage and expansion as steel or aluminium in response to temperature change. However, plastics with such properties generally do not have the compressibility of e.g. polyurethane. Consequently, because of the reduced capability to be compressed, plastic materials having the desired thermal expansion coefficient cannot be used to fixedly clamp a printing cylinder sleeve, at least not when the deformable rings have rectangular cross-sectional profile. As a consequence of the cross-sectional profile of the deformable rings of the mandrel according to the invention, the advantages of the mandrel known from WO2016159764 can be maintained, while the choice of the material for the deformable rings can be more focused on the thermal expansion coefficient and the rate of expansion and shrinkage in response to temperature change.

In fact, the deformation is now predominantly obtained by virtue of change in shape of the cross-sectional profile, i.e. deflection of the first and second arms when going from the released state to the locked state and vice versa instead of pushing away material within a rectangular shape by axial compression resulting in radial expansion of the material.

In an embodiment, the material of the deformable rings is preferably plastic with a thermal expansion coefficient which is equal or smaller than that of steel and/or aluminium, more preferably polyether ether ketone (PEEK). PEEK has very has a thermal expansion coefficient which is smaller than steel and aluminium and is a high performance engineering plastic. Although PEEK is very hard and has virtually no compressibility, due to the special shape of the deformable rings with the first and second arms, a very reliable fixation of the sleeve on the mandrel will be obtained and the problem of inadvertent fixation of the sleeve on the mandrel shaft in the released state of the locking ring due to temperature changes is solved.

The invention also provides a printing apparatus cylinder for use in a printing apparatus. The printing cylinder comprises a mandrel according to the invention and a cylindrical sleeve that is slidably mountable on the mandrel when the locking assembly is in an unlocked position. The deformable rings are in engagement with the inner surface of the printing sleeve when the locking assembly is in the locked position such that a press fit connection between the deformable rings and the sleeve is provided and the printing sleeve and the mandrel are fixedly connected.

The printing apparatus cylinder has the same advantages as those which have been described with respect to the mandrel.

Finally, the invention provides a printing apparatus for printing on a substrate web, the printing apparatus comprising at least one printing apparatus cylinder according to the invention.

BRIEF DESCRIPTION OF THE FIGURES

FIG. 1 shows a perspective exploded view of an example of a mandrel;
FIG. 2 shows a elevational view of the mandrel of FIG. 1;
FIG. 3 shows a cross-sectional view over line III-III from FIG. 2.

DETAILED DESCRIPTION

Figure 4:
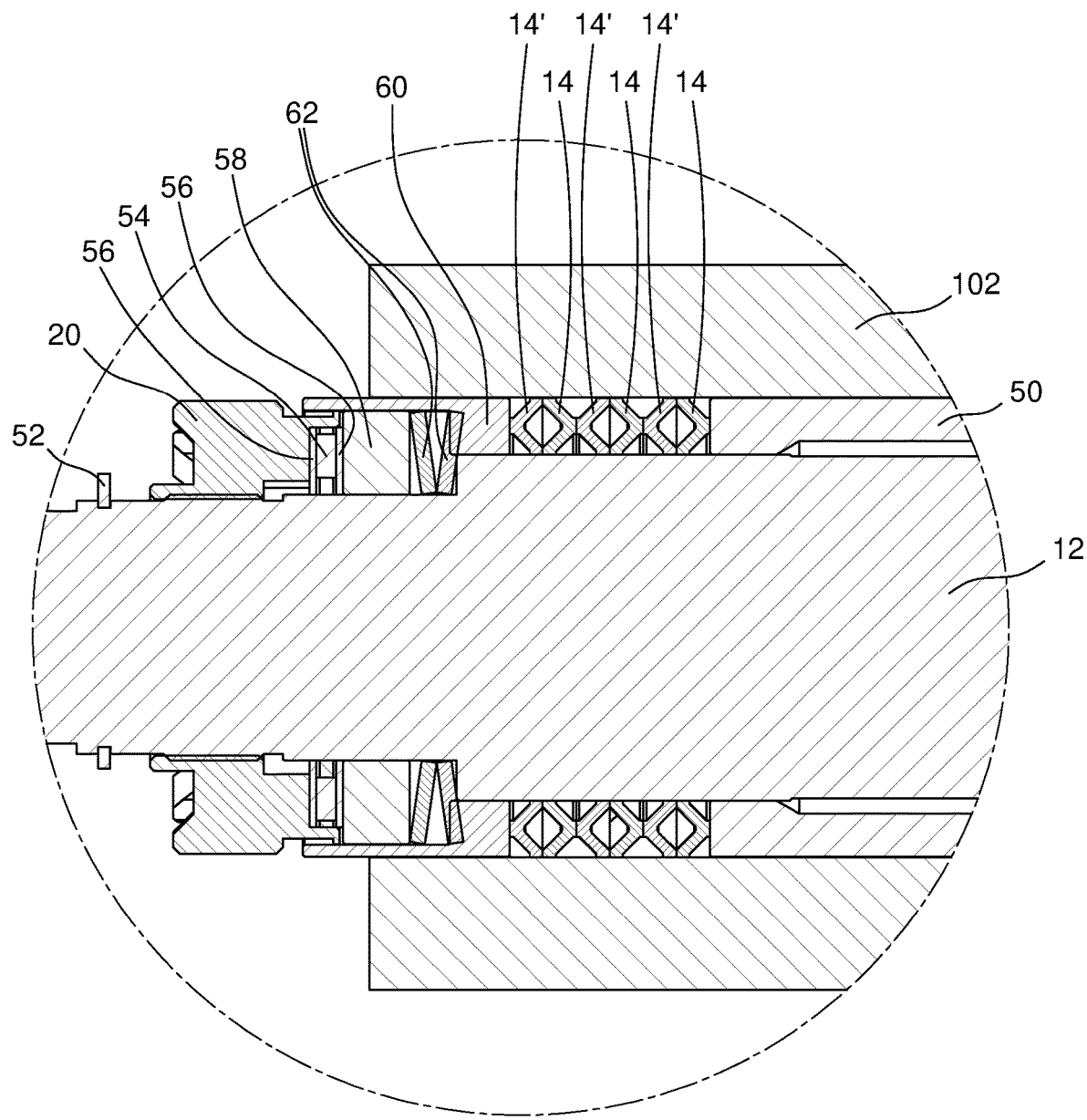
FIG. 4 shows detail IV from FIG. 3.
Figure 5:
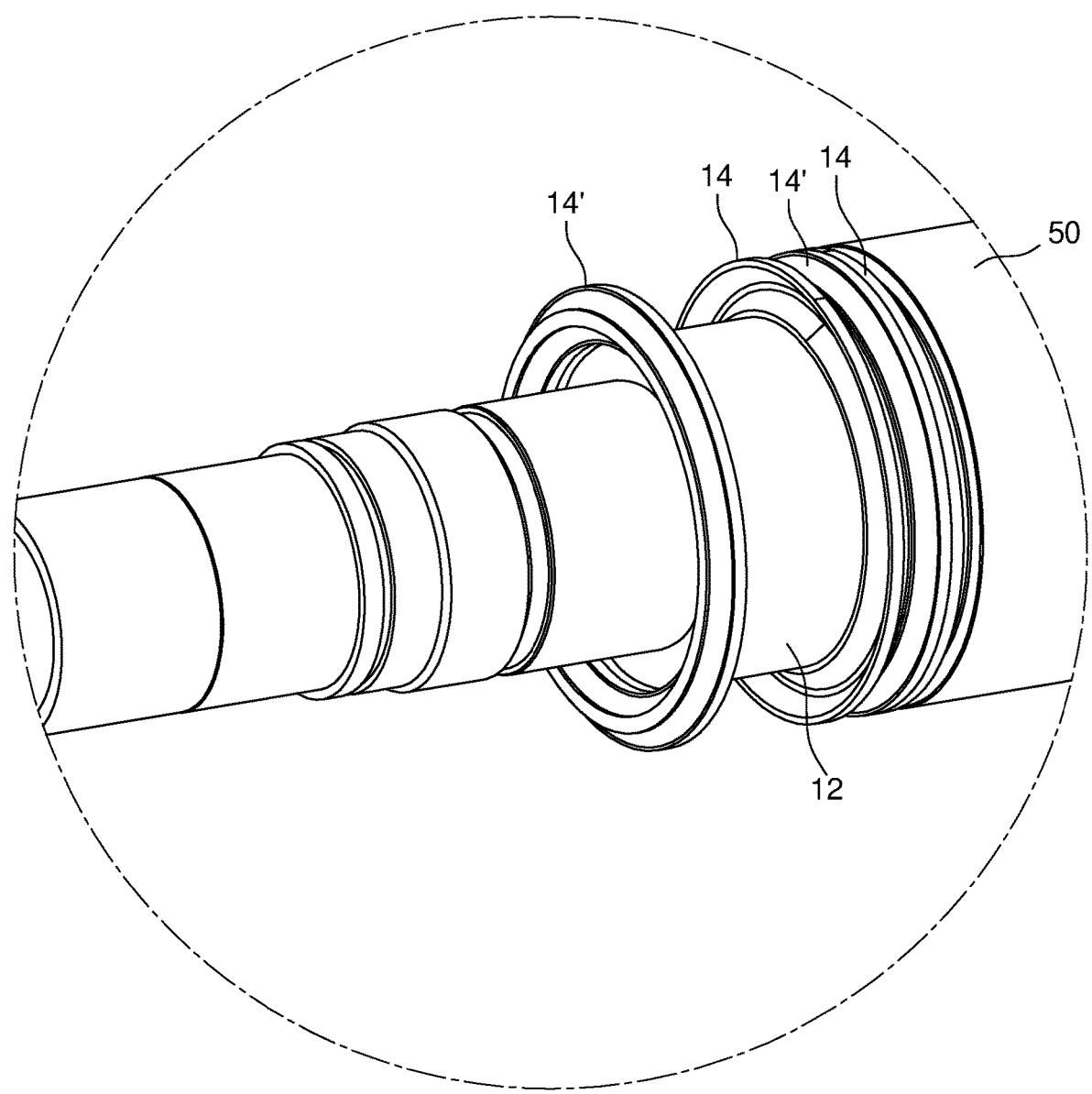
FIG. 5 shows detail V from FIG. 1.
Figure 6:
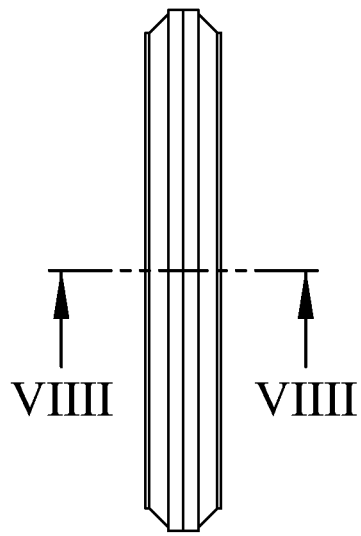
FIG. 6 shows a first embodiment of a pair of neighboring deformable rings.
Figure 7:
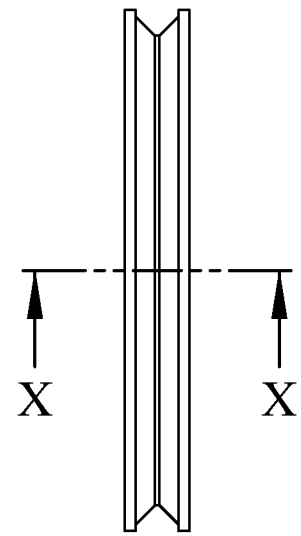
FIG. 7 shows a second embodiment of a deformable ring.
Figure 8:
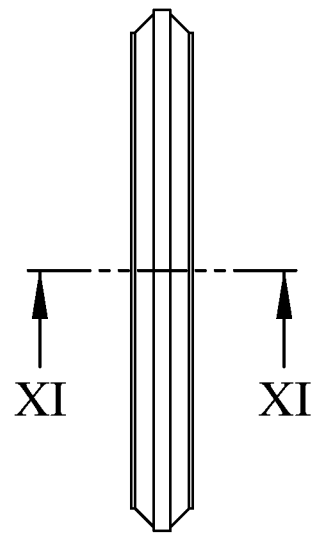
FIG. 8 shows a third embodiment of a deformable ring.
Figure 9:
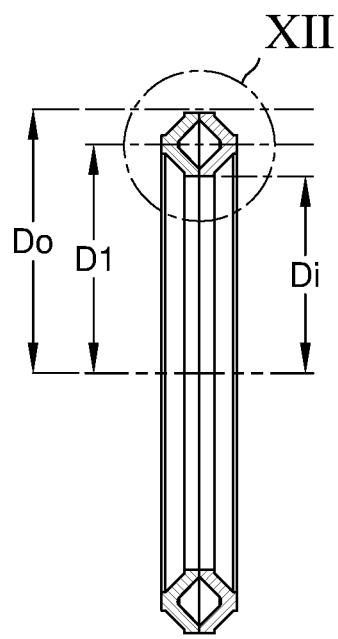
FIG. 9 shows a cross-sectional view over line VIIII-VIII of the first embodiment of FIG. 6.
Figure 10:
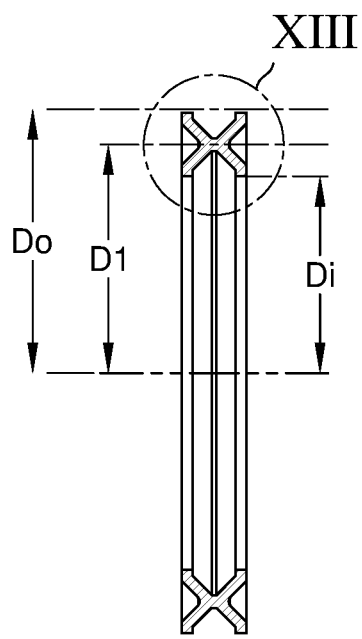
FIG. 10 shows a cross-sectional view over line X-X of the second embodiment of FIG. 7.
Figure 11:
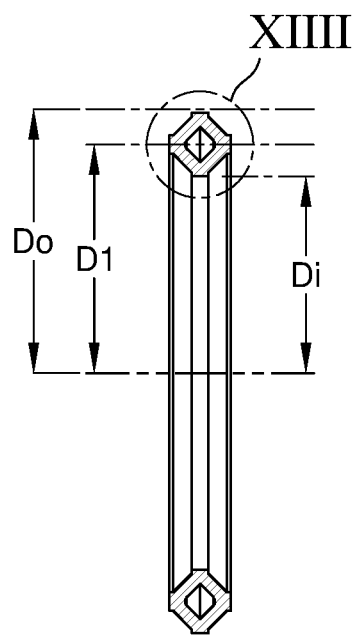
FIG. 11 shows a cross-sectional view over line XI-XI of the third embodiment of FIG. 8.

In this application similar or corresponding features are denoted by similar of corresponding reference signs. The description of the various embodiments is not limited to the examples shown in the figures and the reference numbers used in the detailed description and the claims are not intended to limit the description of the embodiments. The reference numbers are included to elucidate the embodiments by referring to the examples shown in the figures.

In most general terms, the invention provides a mandrel 10 for use in a printing apparatus 108, the mandrel 10 comprising a substantially cylindrical mandrel shaft 12 extending along a mandrel shaft axis A. The mandrel 10 includes a locking assembly, comprising a stop ring 18, a locking ring 20, and a plurality of deformable rings 14, 14' which are slidably and coaxially mounted on the mandrel shaft 12. The deformable rings 14, 14' are mounted between the stop ring 18 and the locking ring 20. The locking assembly has a locked position in which the locking ring 20 is positioned closer to the stop ring 18 than in an unlocked position. In the locked position an outer diameter of the deformable rings 14, 14' is larger than in the unlocked position of the locking assembly., Each deformable ring 14, 14' has a cross-sectional profile in a cross-sectional plane in which the mandrel shaft axis A extends (see cross-sections in FIGS. 9-14).The cross-sectional profile comprises a first arm 22 and a second arm 24 which are integrally connected to each other at a first connection point 26. The first connection point 14' is at a first diameter D1 which is between an inner diameter Di and an outer diameter Do of the deformable ring 14, 14'. Viewed perpendicular to the cross-sectional plane, the first arm and the second arm 22, 24 respectively extend in a first direction L1 and a second direction L2 which first and second directions L1, L2 include an angle which is sharper in the unlocked position than in the locked position of the locking assembly. The first arm 22 has an first-arm-end 28 remote from the first connection point 26 which first-arm-end 28 defines the outer diameter Do of the deformable ring 14, 14'. The second arm 24 has a second-arm-end 30 remote from the first connection point 26 which second-arm-end 30 defines the inner diameter Di of the deformable ring 14, 14'.

The new deformable rings may be manufactured from a plastic that is virtually not compressible, in contrast to e.g. polyurethane, and that has a thermal coefficient of expansion which is relatively small, i.e. smaller than steel or aluminium. Thus, unintended clamping due to increased temperature is prevented. The special geometry of the deformable rings provides the deformability, in particular the radial increase in dimension when axially being reduced in axial length. This is achieve by deflection of the first and second arms 22, 24 relative to each other. The deflection is an elastic deformation. When the axial reduction in length of a deformable ring due to the forces exerted by the locking ring 20 is removed, the elastic behaviour of each deformable ring 14, 14' will bring the first and second arms 22, 24 back to their original position in which the outer diameter of the deformable ring 14, 14' is again reduced.

In an embodiment, the deformable rings 14, 14' are plastic rings with a thermal expansion coefficient which is equal or smaller than that of steel and/or aluminium. Deformable rings with such an thermal expansion coefficient will not inadvertently clamp a sleeve 100 when the locking ring 20 is in the unlocked position even not when the temperature of the deformable rings 14, 14' is higher than then room temperature. Herein, the thermal expansion coefficient may be the linear thermal expansion coefficient and/or the volumetric thermal expansion coefficient.

In an embodiment, a plastic with good elastic properties, high durability and the relatively small desired thermal expansion coefficient may be polyether ether ketone (PEEK).

In the above, the mandrel shaft 12 is said to be substantially cylindrical. In this context it should be noted that this means that the mandrel shaft 12 comprises at least one, and as shown in the example, a number of substantially cylindrical parts. A cylindrical part may have external screw thread, for example for mounting the locking ring 20 which may have internal screw thread. The substantially cylindrical mandrel shaft 12 may include various steps which form transitions between mandrel shaft parts of different diameters. As shown in the example of FIGS. 1-5, the mandrel 10 may include additional parts. In the shown example, adjacent a second end 12b of the mandrel shaft 12, a keeper clip 52, an axial bearing 54 with two bearing rings 56 for facilitating rotation of the stop locking ring 20 are shown. Additionally, a first intermediate ring 58 and a second intermediate pressure ring 60 and two washers 62 which may serve to evenly spread the force exerted by the locking ring 20 over the intermediate pressure ring 58 are visible. At the first end 12a of the mandrel shaft a radial bearing 64 is shown which may be engaged by a support shaft of a printing apparatus 108. At the second end 12b, the mandrel shaft 12 may have a configuration which may be engaged by a drive of the printing apparatus 108.

In an embodiment, the first and the second arms 22, 24, when viewed perpendicular to the cross-sectional plane, may be mirror-symmetric relative to a first mirror axis M1 which extends parallel to the mandrel axis A and crosses the first connection point 26. See in this respect FIGS. 12-14. Such an embodiment provides optimal deformation behavior with a good repeatability and durability.

In an embodiment, the cross-sectional profile of a deformable ring 14 or of a neighboring pair of deformable rings 14, 14' may define a substantially polygonal shape which includes the first arm 22 and the second arm 24 as well as a third arm 32 and a fourth arm 34. See in this respect the examples shown in FIGS. 12 and 14. The third arm 32 and the fourth arm 34 are integrally connected at a second connection point 36. The second connection 36 point is at a second diameter D2 which is substantially equal to the first diameter D1. The third arm 32 has a third-arm-end 38 remote from the second connection point 36 which third-arm-end 38 is at the outer diameter Do. The fourth arm 34 has a fourth-arm-end 40 remote from the second connection point 36 which fourth-arm-end 40 is at the inner diameter Di.

Figure 12:
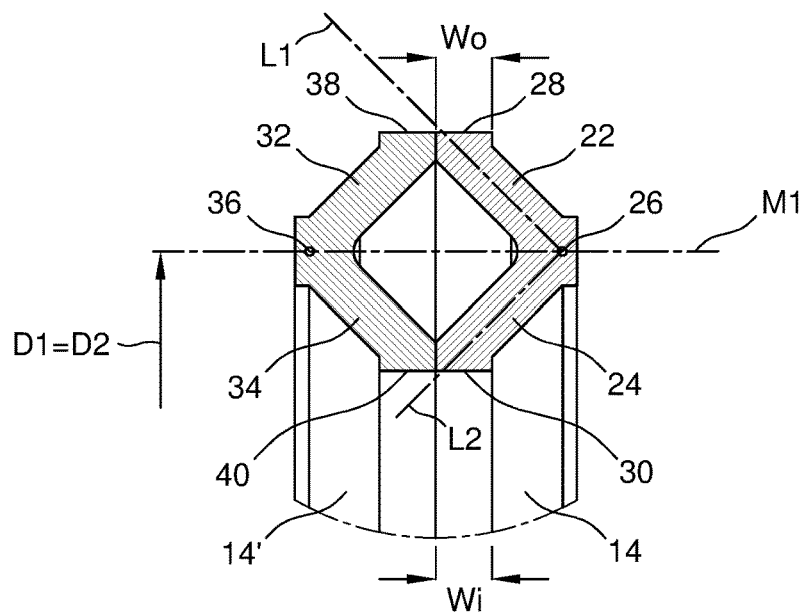
FIG. 12 shows detail XII of FIG. 9.

In an embodiment, of which an example is shown in FIG. 12, the first and the second arms 22, 24 may be part of a first integrally formed deformable ring 14 of the neighboring pair of deformable rings 14, 14'. The third and the fourth arm 32, 34 may be part of a second integrally formed deformable ring 14' of the pair of deformable rings 14, 14'. In a mounted condition of the neighboring pair of the first and the second integrally formed deformable rings 14, 14', the first-arm-end 28 and the third-arm-end 38 abut against each other and the second-arm-end 30 and the fourth-arm-end 40 abut against each other.

Figure 14:
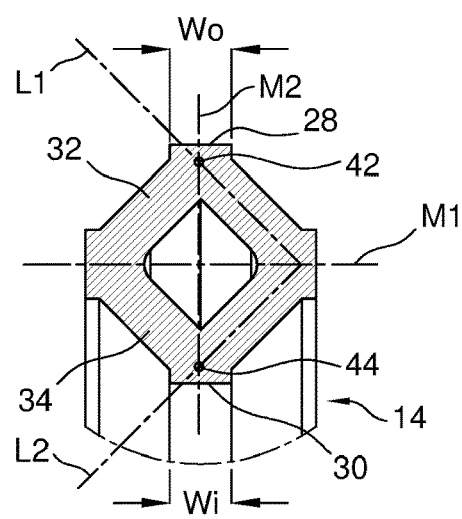
FIG. 14 shows detail XIIII of FIG. 11.

Thus the pair of deformable rings 14, 14' forms in fact the polygonal structure describe above which is very similar to the deformable structure shown in the example of FIG. 14.

In an embodiment, the first, the second, the third and the fourth arms 22, 24, 32, 34 may be integrally formed as shown in the examples of FIG. 14. In this embodiment, the first and the third arm 22, 32 are integrally connected at a third connection point 42 which is at a third diameter which substantially corresponds with the outer diameter Do of the deformable ring 14. The second and the fourth arms 24, 34 are integrally connected at a fourth connection point 44 which is at a fourth diameter which substantially corresponds with the inner diameter Di of the deformable ring 14.

This type of deformable ring 14 has a very stable construction due to its closed shape.

Figure 13:
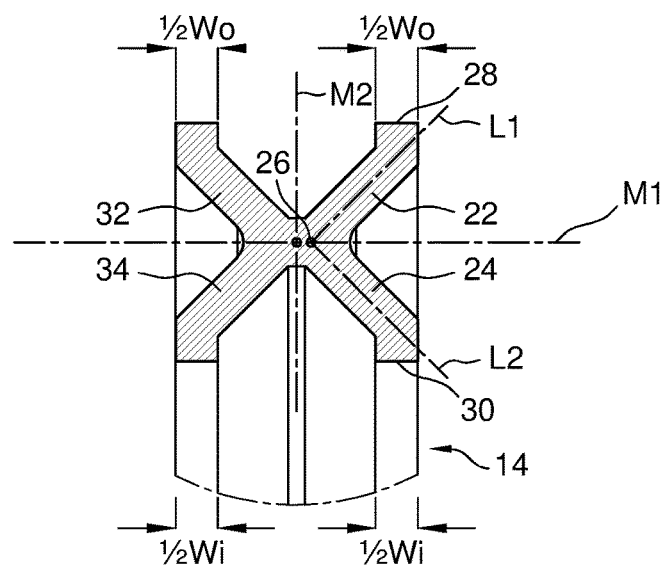
FIG. 13 shows detail XIII of FIG. 10.

In an embodiment, of which examples are shown FIGS. 13 and 14, the first and the third arms 22, 32 may be mirror-symmetric relative to a second mirror axis M2 which extends perpendicular to the mandrel axis A and crosses the first-arm-end 28, the second-arm-end 30, the third-arm-end 38, and the fourth-arm-end 40.

Thus the deformation behavior of the third and the fourth arms 38, 40 will be the same as the deformation behavior of the first and the second arms 22, 24.

In an embodiment, of which an example is shown in FIG. 13, the cross-sectional profile of the deformable ring 14 may be X-shaped. The cross-sectional profile may include the first arm 22 and the second arm 24 as well as a third arm 32 and a fourth arm 34. The third arm 32 and the fourth arm 34 are integrally connected at first connection point 26. Viewed perpendicular to the cross-sectional plane, the first and the third arms 22, 32 are mirror-symmetric relative to a second mirror axis M2 which extends perpendicular to the mandrel axis A and crosses the first connection point 26. The second and the fourth arms 24, 34 are mirror-symmetric relative to the second mirror axis M2.

Also a deformable ring 14 with this X-shaped cross-sectional profile provides a very durable deformable ring of which the elastic deformation behavior is repeatable and predictable.

In an embodiment, of which a example is shown in FIGS. 1-5, the mandrel 10 may comprise a first plurality 46 deformable rings 14 or deformable ring pairs 14, 14' adjacent a first end 12a of the mandrel shaft 12 as well as a second plurality 48 of deformable rings 14 or deformable ring pairs 14, 14' adjacent a second end 12b of the mandrel 12.

This configuration of the mandrel 10 provides a stable mounting of a cylindrical sleeve 102 on the mandrel 10.

In an embodiment, a spacer cylinder 50 may be slidably mounted on the mandrel shaft 12 between the first plurality 46 and the second plurality 48 of deformable rings 14, 14'. In this embodiment, the stop ring 18 is adjacent the first end 12a of the mandrel shaft 12 and wherein the locking ring 20 is adjacent the second end 12b of the mandrel shaft 12.

Thus, only one locking ring 20 and one stop ring 18 are mounted on the mandrel shaft 12. The advantage of this configuration is that for releasing a cylindrical sleeve 102, only one locking ring 20 has to be brought into the unlocked position. Thus, the locking and unlocking can be performed from one side of the printing apparatus 108 in which the mandrel 10 is mounted.

In an alternative embodiment, the mandrel 10 may comprises a first locking ring 20 adjacent the first end 12a and a second locking ring adjacent the second end of the mandrel shaft 12. The stop ring 18 may be positioned between the first plurality 46 and the second plurality 48 of deformable rings 14, 14' and may be integrally formed with or fixedly mounted on the mandrel shaft 12.

In an embodiment, at least one of the locking ring 20 and the stop ring 18 have an outer diameter that is substantially equal to or smaller than the outer diameter Do of the deformable rings 14, 14' in the released state. Thus, the sleeve 102 can be slid over the locking ring 20 and/or stop ring when exchanging sleeves 102.

In an embodiment, the deformable rings 14, 14' have an internal diameter that is substantially equal to an outer diameter of the mandrel shaft 12. Thus a firm clamping of the deformable rings 14, 14' on the mandrel shaft 12 is obtained when the deformable rings are axially compressed.

In an embodiment, of which examples are shown in FIGS. 12-14, each deformable ring 14, 14' has an outer circumferential contact surface for engaging an inner cylindrical surface of a cylindrical sleeve 102. A width or a combined width $W_o$ of the outer circumferential contact surface of each deformable ring 14, 14' is at least 1.5 mm, more preferably at least 2 mm. Additionally, each deformable ring 14, 14' has an inner circumferential contact surface for engaging an outer cylindrical surface of the mandrel shaft 12. A width or combined width $W_i$ of the inner circumferential contact surface of each deformable ring 14, 14' is at least 1.5 mm, more preferably at least 2 mm.

The wider the contact surface, the stronger the friction forces which may be obtained and thus the clamping. Additionally, wider contact surfaces may lead to smaller local contact pressure. Thus, damage of the outer surface of the mandrel shaft 12 or of the inner surface of the sleeve 102 may be minimized. This in contrast to the metal washers known from WO2006114534.

The invention also relates to a printing apparatus cylinder 100 for use in a printing apparatus 108. The printing apparatus cylinder, of which an example is shown in FIGS. 1-5, comprises a mandrel 10 according to the invention and a cylindrical sleeve 102. The cylindrical sleeve 102 is slidably mountable on the mandrel 10 when the locking assembly is in an unlocked position. The deformable rings 14, 14' are in engagement with the inner surface of the printing sleeve 102 when the locking assembly is in the locked position such that a press fit connection between the deformable rings 14, 14' and the sleeve 102 is provided and the sleeve 102 and the mandrel 10 are fixedly connected.

In order to obtain a very good printing quality, in an embodiment of the invention, the sleeve 102 may be a non-deformable cylindrical sleeve 102, in particular a metal sleeve 102, a hard plastic sleeve, e.g. PEEK or a composite sleeve. Especially when the printing apparatus cylinder 100 is a printing cylinder which carries the image and transfers it on the substrate web, a non-deformable cylindrical sleeve 102 is very beneficial for obtaining a good print quality.

In an embodiment, an outer cylindrical surface of the sleeve 102 may include a surface structure that is configured for one of flexographic printing, offset printing, letterpress printing and rotogravure printing.

In an alternative embodiment, the printing apparatus cylinder 100 may include a flexible printing plate that is mounted on an outer cylindrical surface of the printing cylinder sleeve 102. The printing plate 106 may be chosen from a group consisting of a flexographic printing plate, an offset printing plate, a letterpress printing plate, and a rotogravure printing plate.

In an embodiment, an outer cylindrical surface of the sleeve 102 may include a surface structure makes the printing apparatus cylinder 100 fit to serve as a impression cylinder or a blanket cylinder.

The advantage of the printing apparatus cylinder 100 are then not only obtained for the printing cylinders of the printing apparatus 108 but also for the impression cylinders and/or the blanket cylinders.

The various embodiments which are described above may be used independently from one another or may be combined with one another in any combination. The reference numbers used in the detailed description and the claims do not limit the description of the embodiments nor do they limit the claims. The reference numbers are solely used to clarify.

The invention claimed is:

1. A mandrel for use in a printing apparatus, the mandrel comprising:
    a substantially cylindrical mandrel shaft extending along a mandrel shaft axis; and
    a locking assembly, comprising:
        a stop ring;
        a locking ring; and
        a plurality of deformable rings slidably and coaxially mounted on the mandrel shaft,
    wherein the deformable rings are mounted between the stop ring and the locking ring,
    wherein the locking assembly has a locked position in which the locking ring is positioned closer to the stop ring than in an unlocked position,
    wherein in the locked position an outer diameter of the deformable rings is larger than in the unlocked position of the locking assembly,
    wherein each deformable ring has a cross-sectional profile in a cross-sectional plane in which the mandrel shaft axis extends,
    wherein the cross-sectional profile comprises a first arm and a second arm integrally connected to each other at a first connection point,
    wherein the first connection point is at a first diameter between an inner diameter and an outer diameter of the deformable ring,
    wherein, viewed perpendicular to the cross-sectional plane, the first arm and the second arms respectively extend in a first direction and a second direction, the first and second directions including an angle sharper in the unlocked position than in the locked position of the locking assembly, wherein the first arm has a first-arm-end remote from the first connection point, the first-arm-end defining the outer diameter of the deformable ring, and wherein the second arm has a second-arm-end remote from the first connection point, the second-arm-end defining the inner diameter of the deformable ring.

2. The mandrel according to claim 1, wherein the deformable rings are plastic rings with a thermal expansion coefficient equal or smaller than that of steel and/or aluminium.

3. The mandrel according to claim 2, wherein the plastic is polyether ether ketone (PEEK).

4. The mandrel according to claim 1, wherein, viewed perpendicular to a cross-sectional plane, the first and the second arms are mirror-symmetric relative to a first mirror axis extending parallel to the mandrel axis and crossing the first connection point.

5. The mandrel according to claim 1, wherein the cross-sectional profile of a deformable ring or of a neighboring pair of deformable rings defines a substantially polygonal shape including the first arm and the second arm, as well as a third arm and a fourth arm, wherein the third arm and the fourth arm are integrally connected at a second connection point, wherein the second connection point is at a second diameter substantially equal to the first diameter, wherein the third arm has a third-arm-end remote from the second connection point, the third-arm-end being at the outer diameter, and wherein the fourth arm has a fourth-arm-end remote from the second connection point, the fourth-arm-end being at the inner diameter.

6. The mandrel according to claim 5, wherein the first and the second arms are part of a first integrally formed deformable ring of the neighboring pair of deformable rings, wherein the third and the fourth arm are part of a second integrally formed deformable ring of the pair of deformable rings, and wherein, in a mounted condition of the neighboring pair of the first and the second integrally formed deformable rings, the first-arm-end and the third-arm-end abut against each other and the second-arm-end and the fourth-arm-end abut against each other.

7. The mandrel according to claim 5, wherein the first, the second, the third and the fourth arms are integrally formed, wherein the first and the third arm are integrally connected at a third connection point at a third diameter substantially corresponding with the outer diameter of the deformable ring, and wherein the second and the fourth arms are integrally connected at a fourth connection point at a fourth diameter substantially corresponding with the inner diameter of the deformable ring.

8. The mandrel according to claim 5, wherein, viewed perpendicular to the cross-sectional plane, the first and the third arms are mirror-symmetric relative to a second mirror axis extending perpendicular to the mandrel axis and crossing the first-arm-end, the second-arm-end, the third-arm-end, and the fourth-arm-end.

9. The mandrel according to claim 1, wherein the cross-sectional profile of the deformable ring is X-shaped and includes the first arm and the second arm, as well as a third arm and a fourth arm, wherein the third arm and the fourth arm are integrally connected at first connection point, wherein, viewed perpendicular to the cross-sectional plane, the first and the third arms-are mirror-symmetric relative to a second mirror axis perpendicular extending to the mandrel axis and crossing the first connection point, and wherein the second and the fourth arms are mirror-symmetric relative to the second mirror axis.

10. The mandrel according to claim 1, wherein the mandrel comprises a first plurality of deformable rings or deformable ring pairs adjacent a first end of the mandrel shaft, and wherein the mandrel comprises a second plurality of deformable rings or deformable ring pairs adjacent a second end of the mandrel.

11. The mandrel according to claim 10, wherein between the first plurality and the second plurality of deformable rings a spacer cylinder is slidably mounted on the mandrel shaft, wherein the stop ring is adjacent the first end of the mandrel shaft, and wherein the locking ring is adjacent the second end of the mandrel shaft.

12. The mandrel according to claim 10, wherein the mandrel comprises a first locking ring adjacent the first end and a second locking ring adjacent the second end of the mandrel shaft, and wherein the stop ring is positioned between the first plurality and the second plurality of deformable rings and is integrally formed with or fixedly mounted on the mandrel shaft.

13. The mandrel according to claim 1, wherein at least one of the locking ring and the stop ring have an outer diameter substantially equal to the outer diameter of the deformable rings in a released state.

14. The mandrel according to claim 1, wherein the deformable rings have an internal diameter substantially equal to an outer diameter of the mandrel shaft.

15. The mandrel according to claim 1, wherein each deformable ring has an outer circumferential contact surface for engaging an inner cylindrical surface of a cylindrical sleeve, wherein a width or a combined width of the outer circumferential contact surface of each deformable ring is at least 1.5 mm, wherein each deformable ring has an inner circumferential contact surface for engaging an outer cylindrical surface of the mandrel shaft, and wherein a width or a combined width of the inner circumferential contact surface of each deformable ring is at least 1.5 mm.

16. A printing apparatus cylinder for use in a printing apparatus, comprising:

the mandrel according to claim 1; and a cylindrical sleeve slidably mountable on the mandrel when the locking assembly is in an unlocked position, and wherein the deformable rings are in engagement with an inner surface of the printing sleeve when the locking assembly is in the locked position such that a press fit connection between the deformable rings and the sleeve is provided and the sleeve and the mandrel are fixedly connected.

17. The printing apparatus cylinder according to claim 16, wherein the sleeve is a non-deformable cylindrical sleeve, a hard plastic sleeve, or a composite sleeve.

18. The printing apparatus cylinder according to claim 16, wherein an outer cylindrical surface of the sleeve includes a surface structure configured for one of flexographic printing, offset printing, letterpress printing and rotogravure printing.

19. The printing apparatus cylinder according to claim 16 including a flexible printing plate mounted on an outer cylindrical surface of the printing cylinder sleeve, and
   wherein the flexible printing plate is chosen from a group consisting of a flexographic printing plate, an offset printing plate, a letterpress printing plate, and a rotogravure printing plate.

20. The printing apparatus cylinder according to claim 16, wherein an outer cylindrical surface of the sleeve includes a surface structure that makes the printing apparatus cylinder fit to serve as an impression cylinder or a blanket cylinder.

21. A printing apparatus for printing on a substrate web, the printing apparatus comprising at least one printing apparatus cylinder according to claim 16.

* * * * *